(12) United States Patent
Dets et al.

(10) Patent No.: US 12,149,293 B2
(45) Date of Patent: Nov. 19, 2024

(54) BEAM HOMOGENIZATION AT RECEIVER

(71) Applicant: LaserMotive, Inc., Kent, WA (US)

(72) Inventors: Sergiy Dets, Calgary (CA); Thomas J. Nugent, Jr., Bellevue, WA (US)

(73) Assignee: LaserMotive, Inc., Kent, WA (US)

( * ) Notice: Subject to any disclaimer, the term of this patent is extended or adjusted under 35 U.S.C. 154(b) by 77 days.

(21) Appl. No.: 18/054,867

(22) Filed: Nov. 11, 2022

(65) Prior Publication Data

US 2023/0155690 A1 May 18, 2023

Related U.S. Application Data

(60) Provisional application No. 63/279,087, filed on Nov. 13, 2021.

(51) Int. Cl.
*H04B 10/00* (2013.01)
*H04B 10/80* (2013.01)
*H04J 14/00* (2006.01)

(52) U.S. Cl.
CPC .................. *H04B 10/808* (2013.01)

(58) Field of Classification Search
CPC ..... H04B 10/80; H04B 10/806; H04B 10/807
See application file for complete search history.

(56) References Cited

U.S. PATENT DOCUMENTS

2018/0136335 A1* 5/2018 Kare .................. G01S 7/003

* cited by examiner

*Primary Examiner* — Daniel G Dobson

(57) ABSTRACT

A reflector assembly at a power beam receiver includes at least two sets of reflection surfaces positioned to shift some incoming light away from the center of the beam and towards the periphery. These surfaces may be positioned obliquely to one another, for example orthogonally. By shifting a portion of the power beam away from a higher-intensity center and toward a lower-intensity periphery, the reflector assembly may improve receiver efficiency without substantial redirection of power outside of a power-collecting surface of the receiver.

20 Claims, 8 Drawing Sheets

BEAM HOMOGENIZATION AT RECEIVER

CROSS-REFERENCE TO RELATED APPLICATION

This application claims priority to U.S. Provisional Patent Application No. 63/279,087, entitled "BEAM HOMOGENIZATION AT RECEIVER," filed on Nov. 13, 2021, the disclosure of which is incorporated herein by reference in its entirety.

This invention was made with government support under N0014-19-C-2006 awarded by the Office of Naval Research. The government has certain rights in the invention.

BACKGROUND

Power beaming is an emerging method of transmitting power to places where it is difficult or inconvenient to access using wires, by transmitting a beam of electromagnetic energy to a specially designed receiver which converts it to electricity. Power beaming systems may be free-space (where a beam is sent through atmosphere, vacuum, liquid, or other media not designed for optical transmission), or power-over-fiber ("PoF"), where the power is transmitted through an optical fiber. The latter may share certain disadvantages with wires in some circumstances, but may also offer increased transmission efficiency, electrical isolation, and/or safety. Free-space power beaming may be more flexible, but it may also offer more challenges for accurate targeting of receivers and avoiding hazards such as reflections and objects intruding on the power beam.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventors' approach to the particular problem, which in and of itself may also be inventive.

SUMMARY

In one aspect, a power receiver includes a power conversion structure positioned to receive an incoming power beam and configured to convert at least a portion of the incoming power beam to electricity, and input optics configured to convert a substantially round power beam having a center to a substantially polygonal power beam. The input optics include a first set of reflection surfaces configured to shift a first portion of the substantially round power beam away from the center, and a second set of reflection surfaces configured to shift a second portion of the substantially round power beam away from the center. The second set of reflection surfaces are positioned at an angle to the first set.

In another aspect, a power receiver includes a power conversion structure positioned to receive an incoming power beam and configured to convert at least a portion of the incoming power beam to electricity, and input optics configured to convert a substantially Gaussian power beam having a center to a super-Gaussian power beam. The input optics include a first set of reflection surfaces configured to shift a first portion of the substantially round power beam away from the center, and a second set of reflection surfaces configured to shift a second portion of the substantially round power beam away from the center. The second set of reflection surfaces are positioned at an angle to the first set.

In another aspect, a method of transforming a power beam having a center includes positioning input optics in the path of the power beam, the input optics including a first set of reflection surfaces configured to shift a first portion of the substantially round power beam away from the center, and a second set of reflection surfaces configured to shift a second portion of the substantially round power beam away from the center. The second set of reflection surfaces are positioned at an angle to the first set.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF FIGURES

The drawing figures depicts one or more implementations in according with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
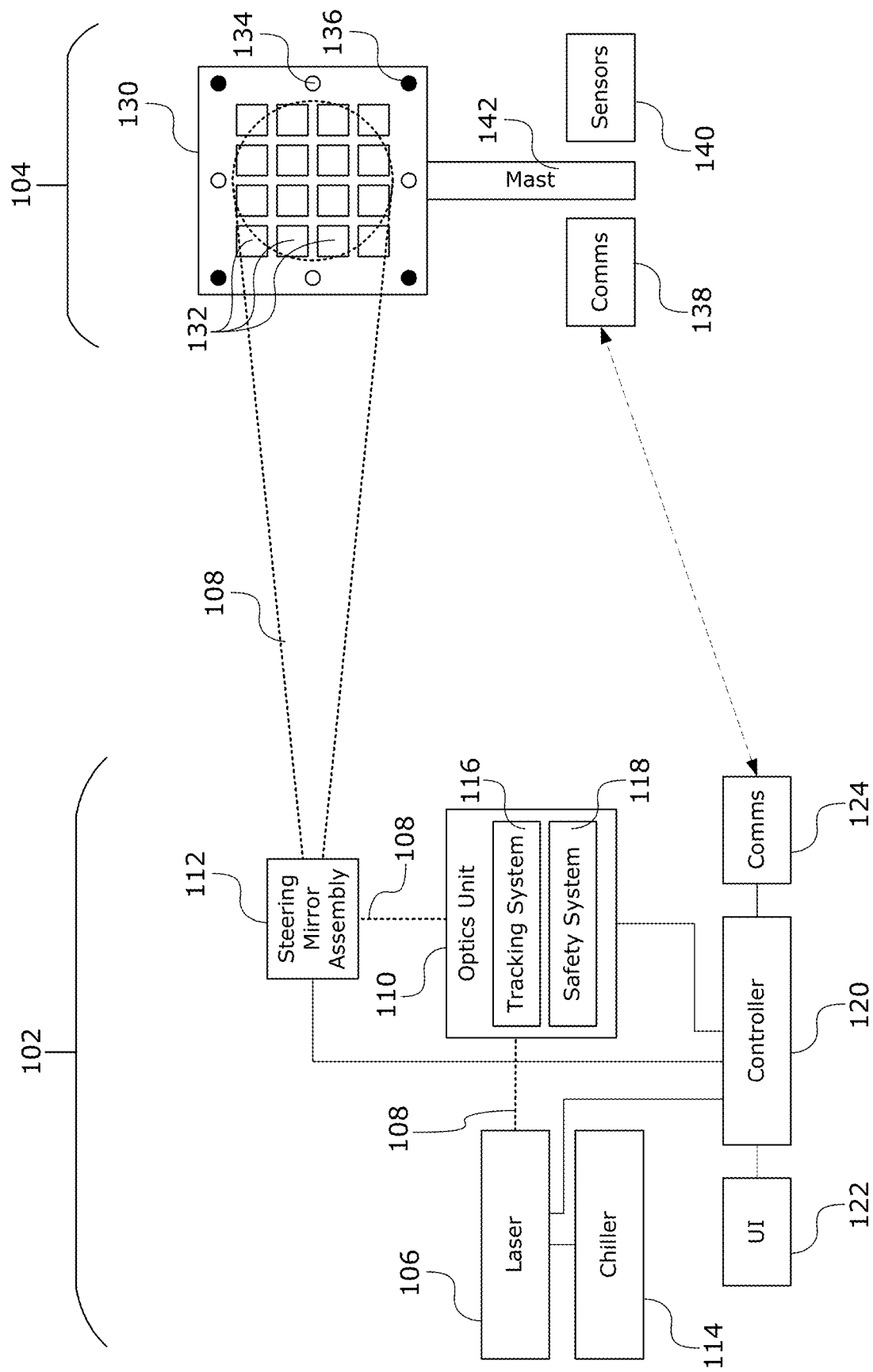
FIG. 1 is a schematic diagram of a power beaming transmitter and receiver.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high level, without detail, in order to avoid unnecessarily obscuring aspects of the present teachings. Those of ordinary skill in the art will nevertheless understand the features of these methods, procedures, components, and/or circuitry and how they may be used in the descriptions below. Other relevant material may be found in other patents and applications as follows:

| | | |
|---|---|---|
| U.S. Pat. No. 9,800,091 | Issued Oct. 24, 2017 | Aerial Platform Powered Via an Optical Transmission Element |
| U.S. Pat. No. 10,825,944 | Issued Nov. 3, 2020 | Device for Converting Electromagnetic Radiation into Electricity, and Related Systems and Methods |
| U.S. Pat. No. 10,634,813 | Issued Apr. 28, 2020 | Multi-Layered Safety System |
| U.S. Pat. No. 10,816,694 | Issued Oct. 27, 2020 | Light Curtain Safety System |
| U.S. Pat. No. 11,105,954 | Issued Aug. 31, 2021 | Diffusion Safety System |
| International Application No. PCT/US16/33117 | Filed May 18, 2016 | Power Beaming VCSEL Arrangement |
| U.S. Pat. No. 10,488,549 | Issued Nov. 26, 2019 | Locating Power Receivers |
| U.S. Pat. No. 10,459,114 | Issued Oct. 29, 2019 | Wireless Power Transmitter and Receiver |
| U.S. Pat. No. 10,374,466 | Issued Aug. 6, 2019 | Energy Efficient Vehicle with Integrated Power Beaming |
| U.S. Pat. No. 11,368,054 | Issued Jun. 21, 2022 | Remote Power Safety System |
| U.S. Pat. No. 10,673,375 | Issued Jun. 2, 2020 | Power-Over-Fiber Receiver |
| U.S. Pat. No. 10,580,921 | Issued Mar. 3, 2020 | Power-Over-Fiber Safety System |
| U.S. Application No. 17/613,015 | Filed Nov. 19, 2021 | Remote Power Beam-Splitting |
| U.S. Application No. 17/613,021 | Filed Nov. 19, 2021 | Safe Power Beam Startup |
| U.S. Application No. 17/613,028 | Filed Nov. 19, 2021 | Beam Profile Monitor |
| U.S. Application No. 17/760,731 | Filed Mar. 15, 2022 | Optical Power for Electronic Switches |
| U.S. Application No. 17/087,198 | Filed Nov. 2, 2020 | Dual-Use Power Beaming System |
| International Application No. PCT/US22/13570 | Filed Jan. 24, 2022 | Power Receiver Electronics |
| U.S. Application No. 17/581,667 | Filed Jan. 21, 2022 | Light Curtain System with Enhanced Geometric Configurations |
| U.S. Provisional Application No. 63/281,618 | Filed Nov. 19, 2021 | Beam Reshaping at Receiver |
| U.S. Provisional Application No. 63/332,663 | Filed Apr. 19, 2022 | Power Receivers and High Power over Fiber |
| U.S. Provisional Application No. 63/369,146 | Filed Jul. 22, 2022 | Power Receiver Electronics |

Each of these related applications and patents is incorporated by reference herein to the extent not inconsistent herewith.

As discussed above, power beaming is becoming a viable method of powering objects in situations where it is inconvenient or difficult to run wires. For example, free-space power beaming may be used to deliver electric power via a ground-based power transmitter to power a remote sensor, to recharge a battery, or to power an unmanned aerial vehicle (UAV) such as a drone copter, allowing the latter to stay in flight for extended periods of time. Power over fiber (PoF) systems usually require optical fiber (or an equivalent) to be run from a power source to a receiver, but may nevertheless provide electrical isolation and/or other advantages over traditional copper wires which carry electricity instead of light.

It will be understood that the term "light source" is intended to encompass all forms of electromagnetic radiation that may be used to transmit energy, and not only visible light. For example, a light source (e.g., a diode laser, fiber laser, light-emitting diode, magnetron, or klystron) may emit ultraviolet, visible, infrared, millimeter wave, microwave, radio waves, and/or other electromagnetic waves, any of which may be referred to herein generally as "light." The term "power beam" is used herein interchangeably with "light beam" to mean a high-irradiance transmission, generally directional in nature, which may be coherent or incoherent, of a single wavelength or multiple wavelengths, and pulsed or continuous. A power beam may be free-space, PoF, or may include components of each. For example, a transmitter may transmit a free-space power beam to a receiver surface, which may conduct it as light over an optical fiber to a photovoltaic (PV) cell which converts it to electricity. For the sake of readability, the description may use the term "laser" to describe a light source; nevertheless, other sources such as (but not limited to) light-emitting diodes, magnetrons, or klystrons may also be contemplated unless context dictates otherwise.

For many applications, a power receiver is arranged to receive the free-space or PoF power beam and convert it to electricity, for example using PV cells or other components for converting light to electricity (e.g., a rectenna for converting microwave power or a heat engine for converting heat generated by the light beam to electricity). For the sake of readability, this application may refer to "PV cells" with the understanding that other components having a similar function (such as but not limited to those listed above) may be substituted without departing from the scope of the application.

Power Beaming Systems

FIG. 1 is a schematic diagram of a power beam transmitter 102 and receiver 104. Laser 106 directs a power beam 108 (shown throughout the diagram as a dotted line) toward optics unit 110, which directs the beam to a beam steering assembly, such as mirror assembly 112. Optics unit 110 may include various lenses, mirrors, and other optical elements, as further discussed below. Steering mirror assembly 112 directs power beam 108 to power receiver 104. Optional chiller 114 is shown as connected to laser 106, but other components of transmitter 102 may also have independent or connected thermal management systems as required. Also shown in FIG. 1 as part of transmitter 102 are tracking system 116 and safety system 118. These systems are shown as being internal to optics unit 110 in the figure, but those of ordinary skill in the art will recognize that in some implementations, they may be external to optics unit 110, part of steering mirror assembly 112, or elsewhere in the transmitter system. Also shown are TX controller 120, user interface 122 and TX communication unit 124, all of which are further discussed below in connection with FIG. 2. It will be understood that transmitter 102 may include other elements, such as beam shapers, guard beams, or other appropriate accessory elements, that have been omitted from FIG. 1 for the sake of simplicity of the illustration. Some of these elements are shown schematically below in FIG. 2, but those of ordinary skill in the art will understand how to combine optical and control elements in a power transmitter.

Receiver 104 includes a PV array 130, which includes a plurality of individual PV cells 132 (not all PV cells are labeled in order to avoid unnecessarily cluttering the figure). PV cells 132 convert incoming power beam 108 into electricity as further described below. Receiver 104 also shows tracking emitters 134, which in some implementations may be used by the tracking system 116 to monitor the position of PV array 130 for beam tracking or for other purposes. Receiver 104 also shows safety emitters 136, which in some implementations may be used by safety system 118 to monitor power beam 108 for potential intrusions, reflections, or other safety hazards. RX communication unit 138 is in communication with TX communication unit 124 (as indicated by the dashed line), and may be used for safety, tracking, telemetry, feedback control, or any other purpose for which it may be desirable for transmitter 102 and receiver 104 to communicate. While the illustrated embodiment provides communication across a separate channel such as a radio link between transmitter 102 and receiver 104, it is also contemplated that communication may be accomplished via modulation of power beam 108, tracking emitters 134, safety emitters 136, or other existing components of the power beaming system. Receiver 104 may also include optional RX sensors 140, further described below in connection with FIG. 3. As shown in FIG. 1, PV array 130 is mounted on optional mast 142, which may elevate receiver 104 to allow power beam 108 to avoid humans or other obstacles.

Figure 2:
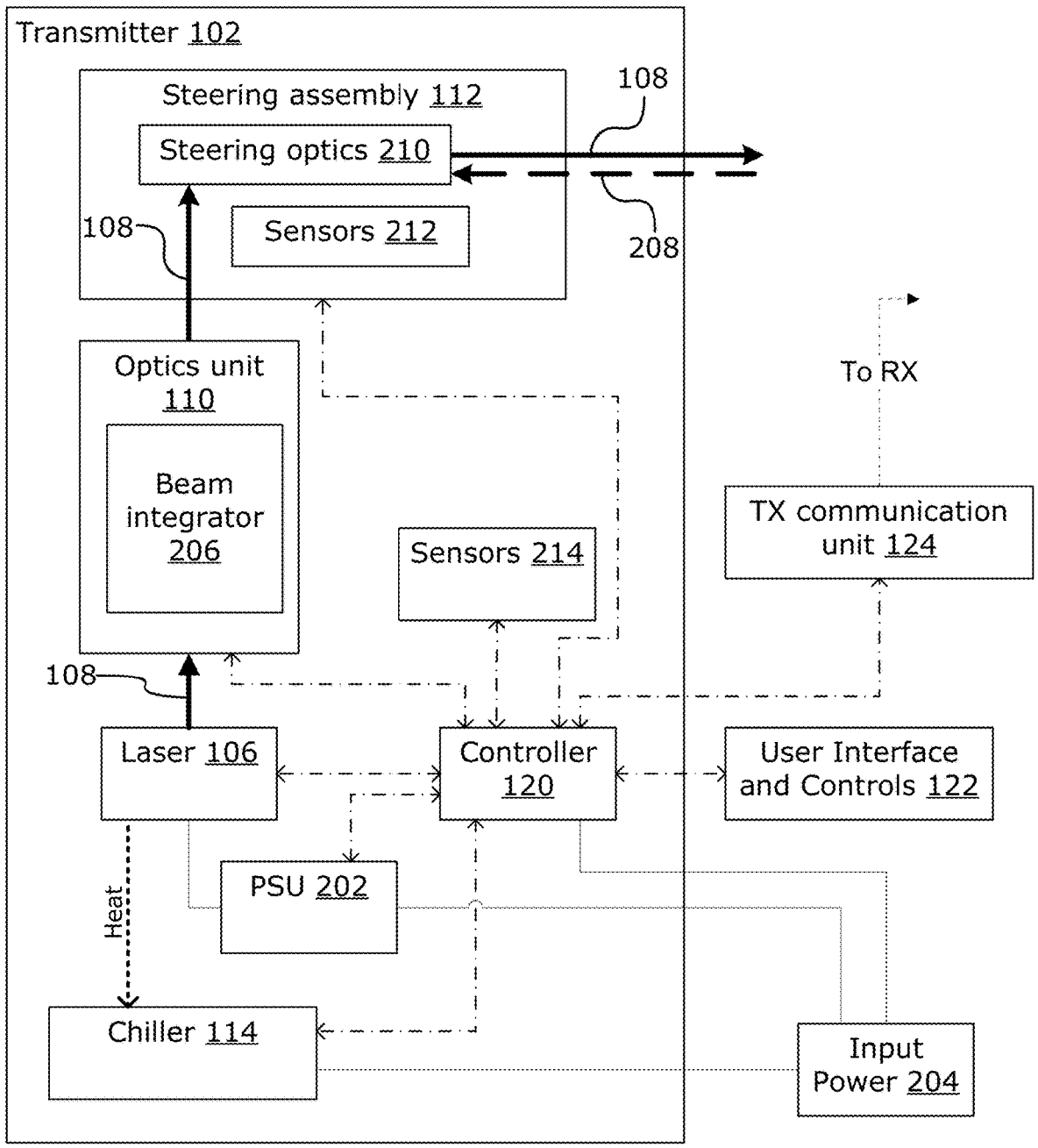
FIG. 2 is an abstracted diagram of the power beaming transmitter of FIG. 1, showing interrelationships between components of the transmitter.

FIG. 2 is an abstracted diagram showing functional relationships between components of the transmitter. Transmitter 102 includes a laser 106, but it will be understood that other light-generating components, such as an LED or a magnetron, may be substituted for laser 106 in some implementations. Laser 106 is connected to controller 120, power supply unit (PSU) 202 (which is in turn connected to input power 204), and a thermal management system (chiller) 114. Throughout FIG. 2 and FIG. 3, heat flow is denoted by heavy dotted lines, while power beam 108 is denoted by a heavy solid line, sensor signals are denoted by heavy dashed lines, data and/or control signals are denoted by dot-dashed lines, and electrical power is indicated by a thin solid line. For the sake of clarity, not all internal electrical connections are shown.

Controller 120 controls operation of laser 106 and may be manual (for example using a user interface 122), partially automated, or fully automated, depending on design constraints of the system. In particular, controller 120 may receive input from a safety system, for example as described in commonly owned U.S. Pat. Nos. 10,634,813 and 10,816,694, U.S. patent application Ser. Nos. 15/574,659 and 16/079,073, International Patent Application No. PCT/US20/34104, and U.S. Provisional Application No. 63/140,236. The safety system may be designed to turn down or to turn off the beam, for example when an uninterrupted optical path from transmitter 102 to receiver 104 cannot be assured or when other hazardous conditions may be associated with continuing to beam power. Controller 120 may receive input (data) from other components, for example to monitor the health or temperature of the laser. PSU 202 draws power from input power 204, which may be, for example, a power grid, a generator, or a battery, and supplies it to laser 106. In the figure, controller 120 and chiller 114 are directly connected to input power 204, but in other embodiments, these or other components may receive power from power supply unit 202. Chiller 114 monitors the temperature of laser 106 (and/or other components of the transmitter as necessary) and makes sure it does not exceed safe values.

As shown in FIG. 2, power beam 108 emerges from light source 106 and enters optics unit 110. It will be understood that while light 108 maintains the same reference numeral throughout FIG. 2, the characteristics of light 108 may change in various ways (e.g., polarization, convergence/divergence angle, beam profile, or intensity) as it passes through different optics and other components. Optics unit 110 may include beam integrator 206 and other optics such as lenses, mirrors, phased arrays, or any other appropriate component for managing direction, divergence, and beam irradiance profile of the light, or for merging different optical power beams and/or signals. Beam integrator 206 will generally be chosen to match the wavelength domain of light source 106, and can be used to change the size, shape, or intensity distribution of the power beam. For example, when beaming power to a receiver, it may be desirable in some implementations to match the beam width to the size of the receiver, and possibly to "flatten" the beam irradiance profile to be relatively uniform across a surface of the receiver, for example converting a substantially Gaussian beam profile to a "top hat" or super-Gaussian profile. Beam direction and beam profile shaping is discussed in more detail in co-pending and commonly owned International Patent Application No. PCT/US20/34095. In particular, the mechanisms described therein for monitoring the placement of a power beam on a receiver and using the monitored data to feed back to controller 120 and/or to steering assembly 112 may be incorporated into the present system.

Steering assembly 112 may include steering optics 210 and/or sensors 212, which may be used in some implementations to provide feedback information for tracking the receiver and pointing the beam at it, to measure the beam characteristics such as direction or irradiance profile, or to monitor for potential intrusions into the light path. Steering assembly 112 may also include merging optics. Merging optics are generally used for combining multiple optical paths, or possibly for separating them when optical flow is in the opposite direction. For example, an outgoing power beam 108 for transmitting power may be combined with an incoming optical beacon 208 used for tracking a receiver, as shown in the figure. As illustrated, the beacon is used at steering assembly 112 for tracking, but in other implementations, signal 208 may propagate to optics unit 110 or beyond.

Transmitter 102 may also be provided with sensors 214, which may be used to monitor ambient conditions. Sensors 212, 214 may be used to adjust beam integrator 206 and/or steering optics 210. For example, sensors 212 might monitor position of a focusing lens or other optical component in steering assembly 112, while sensors 214 might be used to monitor ambient and/or other component temperatures. Data from sensors 212, 214 may be fed back into controller 120 to adjust laser 106, for example for safety considerations, or to control steering optics 210 and/or steering assembly 112 to direct beam 108 onto the receiver. Control and data signals may pass between controller 120 and other components, as shown by dot-dashed lines in FIG. 2, and controller 120 may control communication with the receiver, for example using transmitter communication unit 124.

After passing through optics unit 110, power beam 108 is directed by steering assembly 112 in a desired direction away from transmitter 102. In some implementations, steering assembly 112 may include steering optics 210, motors for adjusting mirrors or other components (not shown), and/or more shaping optics (not shown). Those of ordinary skill in the art will understand that different implementations may require different arrangements of optical elements (such as the order of components that the light passes through) without changing the fundamental nature of the transmitter system.

Figure 3:
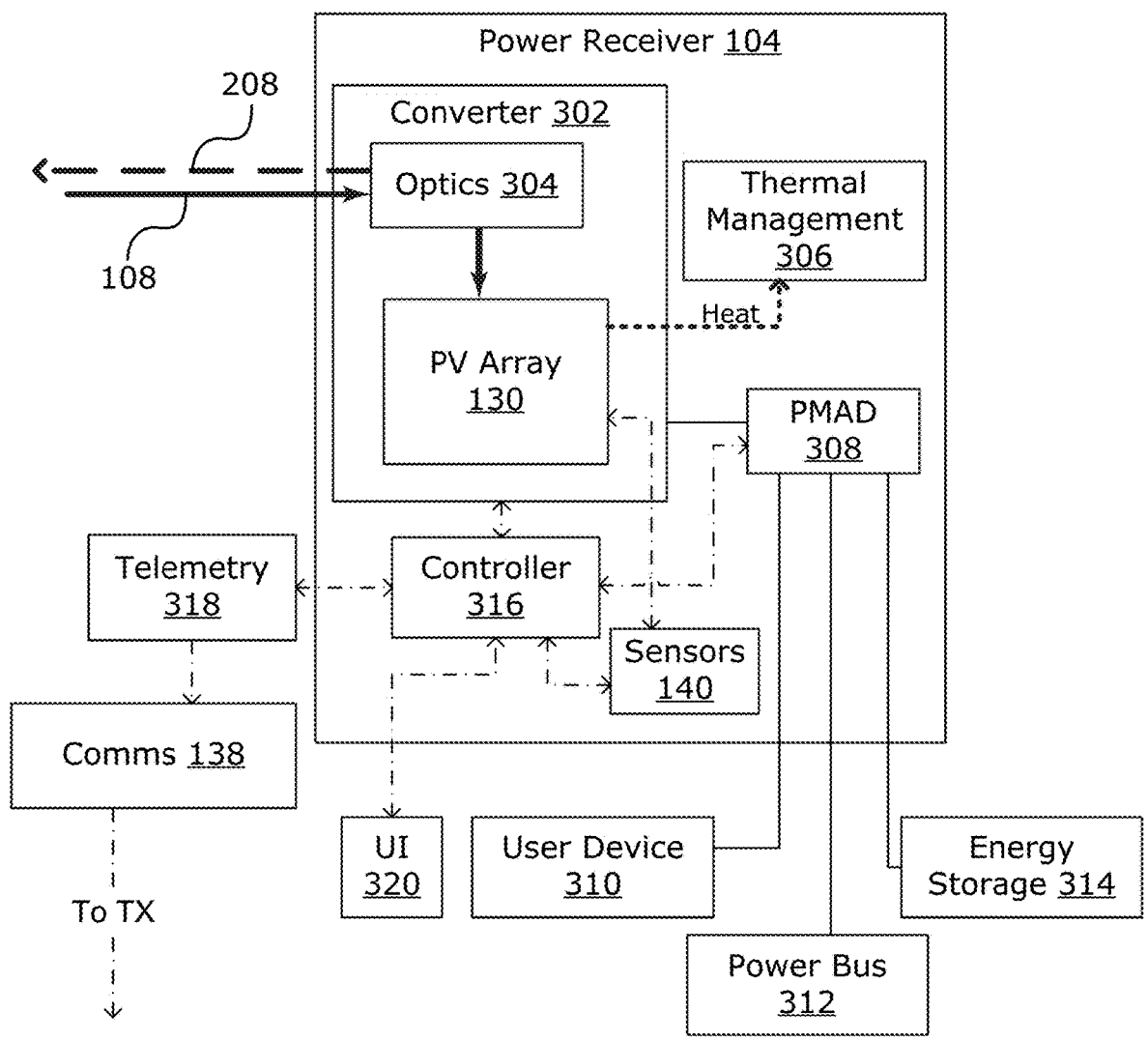
FIG. 3 is an abstracted diagram of the power receiver of FIG. 1, showing interrelationships between components of the receiver.

FIG. 3 shows functional relationships between components of a power receiver 104, such as the receiver shown in FIG. 1. Illustrated receiver 104 includes power converter 302, which includes PV array 130 of PV cells 132. Power converter 302 is configured to convert power beam 108 from laser 106 into electricity (or, in some implementations, into another useful form of energy). Receiver 104 may also include optics 304, which may shape or modify the received beam before it reaches PV array 130, for example as described in International Application No. PCT/US20/34093. In many implementations, PV array 130 includes a thermal management system 306. This system may include passive or active cooling, and it may be configured to send a signal back to transmitter 102 if any part of PV array 130 exceeds safe temperature limits (for example, via RX communication unit 138).

Power converter 302 may further be connected to power management and distribution (PMAD) system 308. PMAD system 308 may power user devices 310, a power bus 312, and/or energy storage devices 314. PMAD system 308 may be connected to controller 316, which may monitor PV array 130 via sensors 140, for example monitoring voltage, current, and/or temperature of individual photovoltaic cells, groups of cells, or of the whole array, voltage and/or current of the PMAD or of individual loads. Controller 316 may also include Maximum Power Point Tracking (MPPT) for PV array 130, or MPPT may be handled by PMAD system 308. PMAD system 308 may also include DC/DC converters, for example to provide power to devices 310, 312, 314 with preferred voltage and current characteristics. Telemetry unit 318 may send any or all of the above data back to the transmitter for use in controlling light beam 108, for example through RX communications unit 138. In some implementations, controller 316 may communicate with a receiver user interface 320, which may allow local viewing and/or control of receiver operations by a user of the power receiver.

Also visible in FIG. 3 is a signal 208 (e.g., an optical signal) being sent back to transmitter 102 by receiver 104, which may be sent along the same path as power beam 108 as shown. In some implementations, for example, signal 208 may include a safety signal that is used to assure an uninterrupted path from transmitter 102 to receiver 104. In some implementations, this signal may be sent from safety emitters 136. More details on safety systems may be found, for example, in commonly owned U.S. Pat. Nos. 10,580,921, 10,634,813, 10,816,694, and 11,105,954, U.S. patent application Ser. No. 16/079,073, and International Patent Application No. PCT/US20/34104. In some implementations, signal 208 may include a tracking signal that is used to position power beam 108 on power converter 302, such as a signal sent from tracking emitters 134. While signal 208 as shown in the figure is an "active" signal, in other implementations, emitters 134, 136 may be replaced by fiducial marks (not shown) that are identified by transmitter 102 or by other appropriate components in the power transmission system.

Any receiver components that require power, for example but not limited to thermal management system 306, RX communication unit 138, PMAD system 308, controller 316, telemetry unit 318, and/or user interface 320, may be powered by power converter 302 (directly or via PMAD 308) if desired. If components are powered by converter 302, the system might include a battery (either as part of energy storage 314 or as a separate component) to power these components during start-up or at other times when converter 302 is not supplying power.

Beam Shaper for Power Beam Receiver

Figure 4:
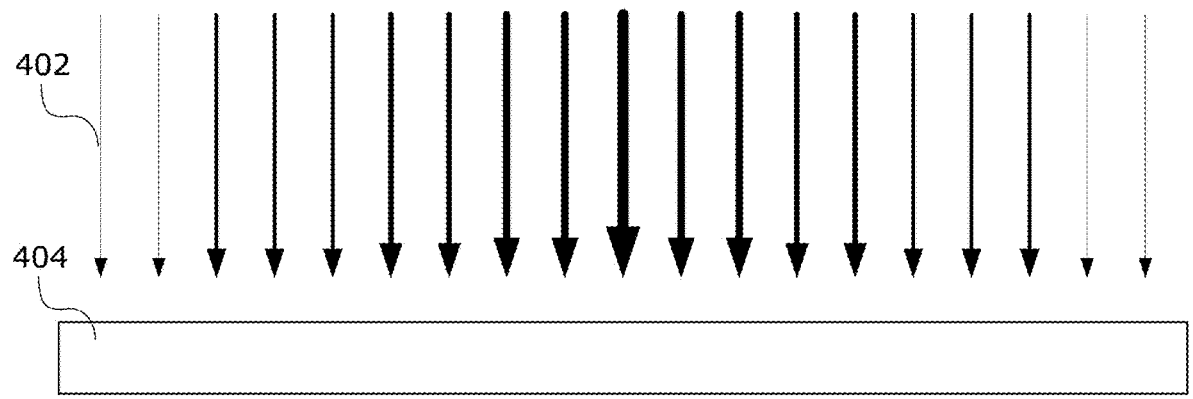
FIG. 4 shows a distribution of power intensity for a Gaussian power beam at a power receiver.
Figure 4:
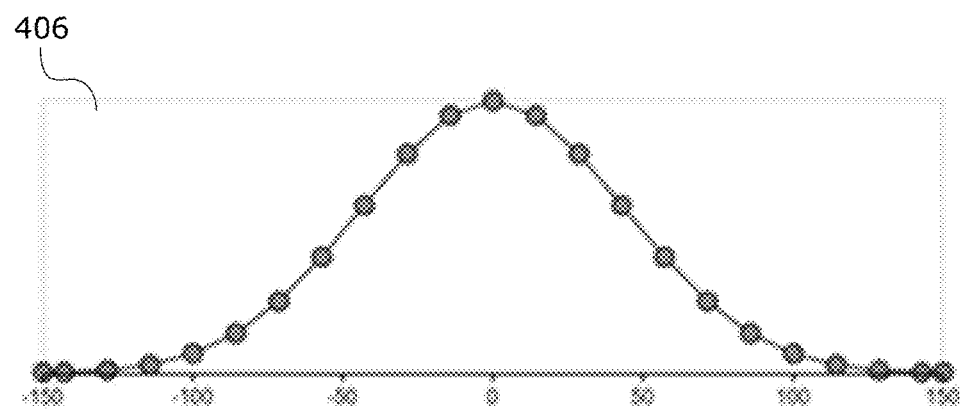

FIG. 4 is a profile of a power beam 402 incoming at a receiver surface 404. A common intensity profile for such a beam is a Gaussian shape, as shown in the intensity graph 406. For such a beam intensity profile, light at the center of the beam is more intense than at the edges. The PV cells (or other power converters) positioned near the center of receiver surface 404 may receive more light than those at the edges by a factor of 2, 5, 10, 20, 50, 100, 200, or even more. This type of incoming profile can present efficiency challenges for the power converter. (A fuller description of this source of inefficiencies and a method of dealing with lack of uniformity of a power beam is described in copending U.S. Provisional Patent Application No. 63/140,256.) It would be preferable in many cases for beam intensity to be more uniform, ideally so that each PV cell receives about the same amount of power. Even if a perfectly flat distribution is not practical, generally a flatter power intensity distribution will tend to lead to improved efficiency of power conversion. Also, distributing the power more evenly across a PV array may allow individual cells in the array to operate in more efficient regimes, preventing cells from receiving more power than can be efficiently converted.

Figure 5:
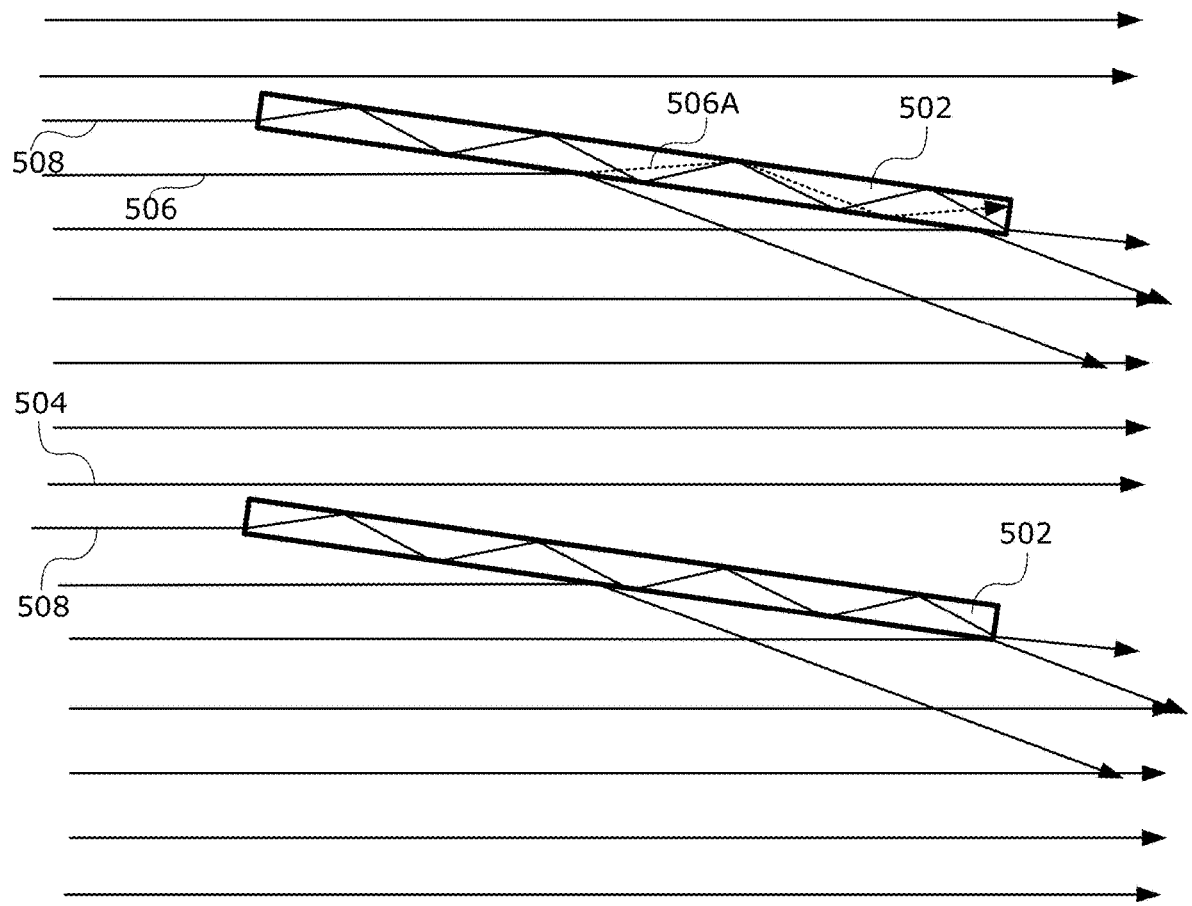
FIG. 5 is a schematic diagram of a reflectors that shift a portion of an incoming power beam at a receiver.

FIG. 5 is a schematic detail of a portion of an assembly located between the incoming beam and PV array 130, for example as part of optics 304, introduced for understanding of principles of the system. Angles of components have been exaggerated to enhance understanding. As shown, a portion of the incoming power beam strikes a set of reflectors 502 and is redirected to a different angle from the incoming beam (as shown in FIG. 5, toward the bottom of the figure). Reflectors 502 may be, for example, glass or another transparent material, which may optionally be coated with a metallic or dielectric coating to enhance their reflectivity. The width and separation of the reflectors is selected so that some light 504 passes straight between the reflectors, while other light 506 is deflected, so that a noncontiguous portion of the incoming power beam is shifted by the deflectors. In some cases, a portion of light 506 may also be refracted into reflector 502 as shown by dotted line 506A. In the depicted example, the reflectors are parallel to one another and form the same angle with the reflected beam, but other embodiments may position reflectors at different angles to the incoming power beam. In some implementations, the reflective planes may not have parallel long axes (approximately perpendicular to the plane of the drawing). A small amount of light 508 is expected to intersect the reflectors at their edges, and this light may refract as shown through the interior of transparent reflectors (or leak away at the repeated intersections with the surfaces of the reflector, not shown to avoid unnecessarily complicating the figure). In implementations where the reflectors are not themselves made of a transparent material, light 508 may be reflected away or absorbed, rather than propagated through the reflector. In some implementations, it may be preferred to make reflectors 502 as thin as mechanically practical to minimize the amount of the power beam affected by the edge. In some implementations, the edges of the reflectors may be shaped, and/or may have an antireflective coating, in order to avoid reflecting high-intensity light away from the power receiver and creating a possible safety hazard.

Figure 6:
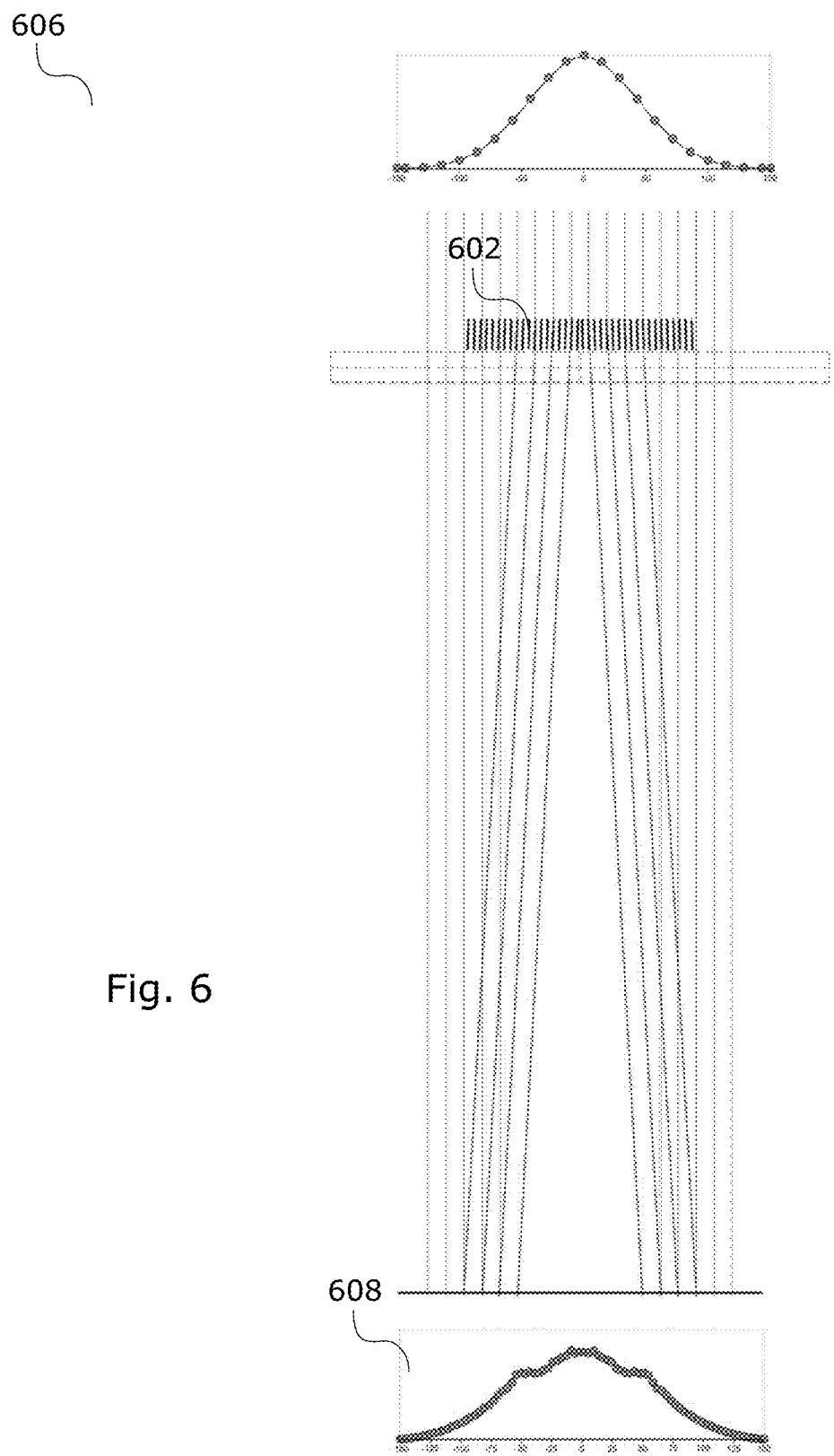
FIG. 6 is a schematic diagram of a reflector assembly using principles as shown in FIG. 5 to flatten an intensity profile of a beam in a transverse direction.

FIG. 6 shows an effect of a reflector assembly like that of FIG. 5, consisting of an array 602 of parallel reflectors (analogous to the two reflectors 502 shown in FIG. 5). (Individual reflectors are too small to be individually visible in FIG. 6.) The array 602 is positioned so that reflectors in the left half of the drawing deflect incoming light toward the left side of the figure, and reflectors in the right half of the drawing deflect incoming light toward the right side of the figure. A plot 606 of light intensity for light entering the reflector assembly and for light 608 arriving at the receiver is also shown. It can be seen that the intensity profile has been flattened by the action of the reflector array 602. The exact profile created is a function of reflector material selection, surface quality, geometry (thickness, length, width, parallelism, and shape), number, spacing, and tilt angle of reflectors, and distance from reflectors to the receiver. In one implementation, a total of twelve reflectors were positioned at 1.6 degrees to the incoming power beam, with six reflectors tilted in each direction. In this implementation, reflectors were approximately 41 cm long and 2.5 cm wide, with a thickness of approximately 0.7 mm, and were spaced about 7 mm apart. They were positioned approximately 70 cm away from the 30 cm×30 cm light-collecting surface of the receiver. This implementation included two such sets of twelve reflectors, placed transverse to one another, as more clearly seen below in FIG. 7.

Figure 7:
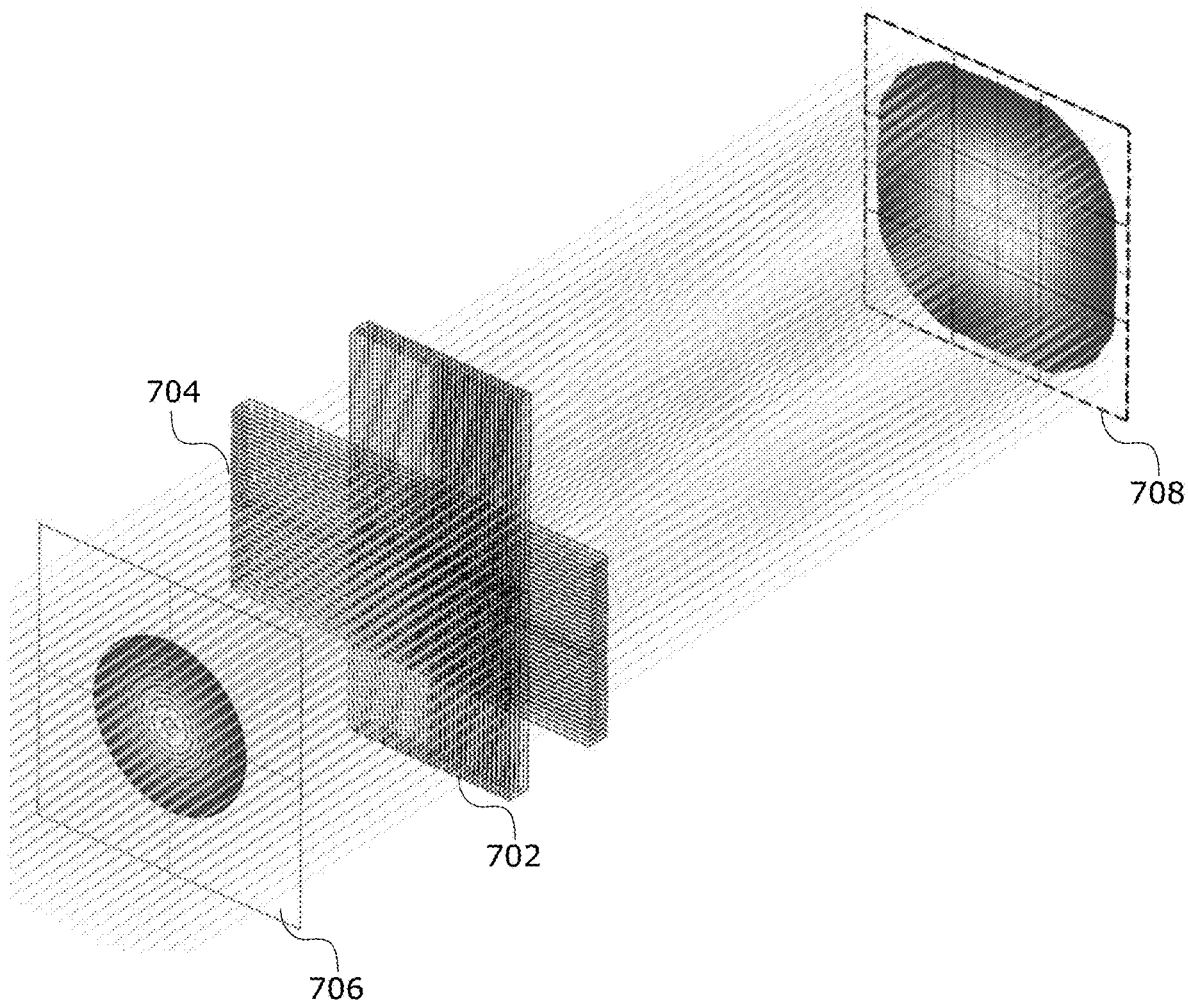
FIG. 7 shows two reflector assemblies as in FIG. 6 positioned orthogonally to one another.

FIG. 7 is a schematic of a system including two layers of reflectors like the one described in connection with FIG. 6, positioned orthogonally to one another. The Gaussian power beam first encounters assembly 702 which deflects a portion of the beam to the left and the right, and immediately afterward encounters assembly 704 which deflects a portion of the beam to the top and bottom. Reflector assemblies 702, 704 are positioned substantially orthogonal to one another, but other angles may also be used for some applications. Reflector assemblies 702, 704 preferably do not span the entire width of the power beam, but only a portion thereof, so that the highest-intensity light in the center is deflected, while relatively lower-intensity light at the edges of the power beam is allowed to go directly to the receiver. An intensity profile of the beam is shown at 706 before it reaches the reflector assemblies, and at 708 as it arrives at power converter 302. Not only is the peak intensity substantially flattened compared to the unmodified beam, but the intensity distribution has an approximately dihedral symmetric ("square-ish") shape, instead of the radially symmetric shape (substantially circular beam) it had before encountering the deflector arrays. In some implementations, this symmetry may be more convenient for powering a square PV array. In other implementations, a system might produce a substantially threefold symmetry by interposing three arrays in the light path (positioned at 60 degree angles to one another), or even a substantially octagonal shape by interposing four arrays in the light path (positioned at 45 degree angles to one another). It is noted that in such cases, the order of the deflector arrays may have an effect on the resultant beam shape. Those of ordinary skill in the art will understand how to model such systems to achieve predictable illumination patterns.

Figure 8:
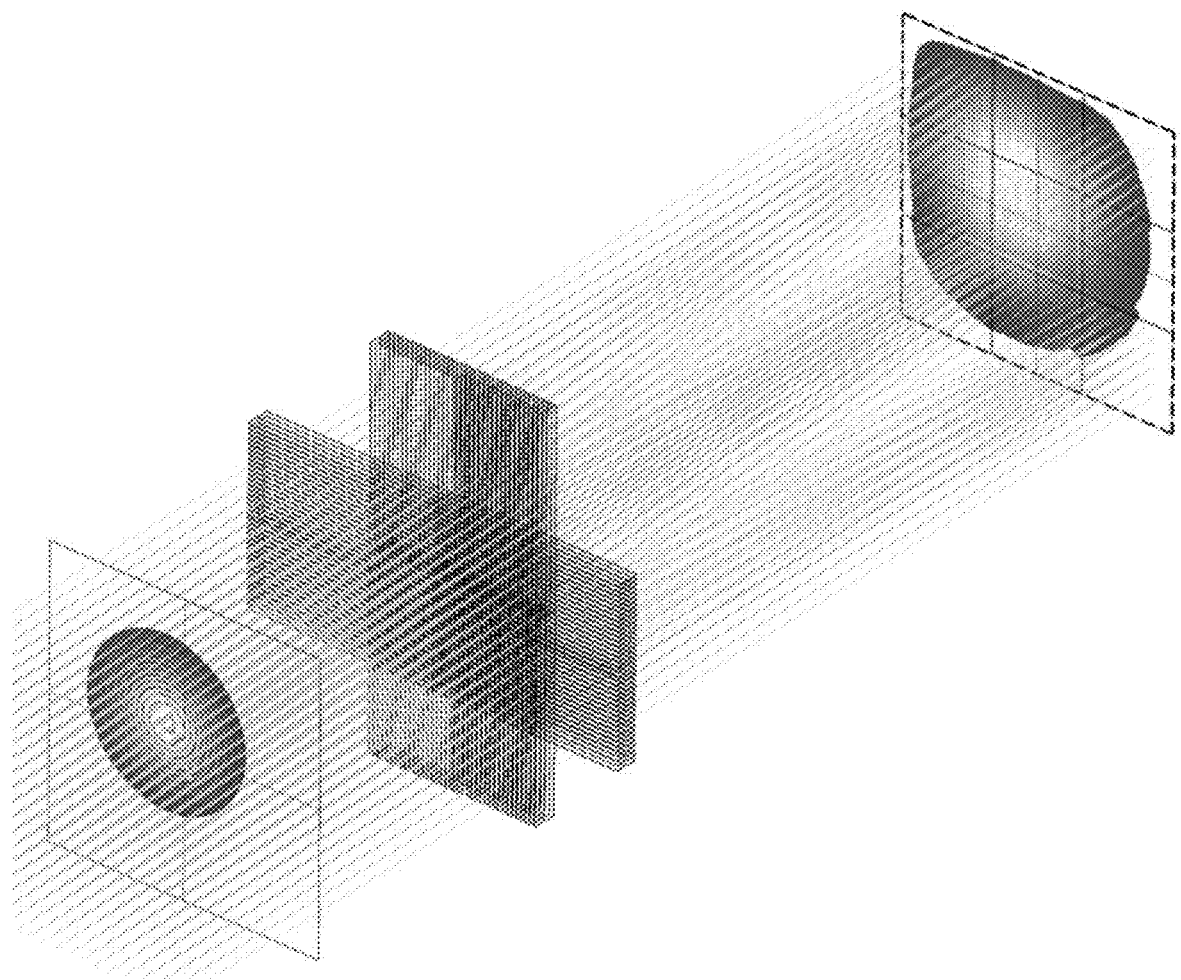
FIG. 8 shows the transformation of light intensity when the power beam is not centered on the two reflector assemblies of FIG. 7.

The system shown in FIG. 7 does not maintain symmetry when the power beam shifts laterally. FIG. 8 shows the profile of an off-center power beam that has passed through the same two reflector assemblies. The beam profile is still more uniform than the original off-center Gaussian profile, but some light is lost off the side of the power receiver, and the most intense area (the "hot spot") has shifted in the same direction as the overall beam and increased somewhat compared to the centered beam. Systems for maintaining power beam alignment on the receiver are recommended for maximum efficiency of the power beaming system.

While the foregoing has described what are considered to be the best mode and/or other examples, it is understood that various modifications may be made therein, and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended to be as broad as is consistent with the ordinary meanings of the language that is used in the claims when interpreted in light of this specification and the prosecution history that follows and to encompass all structural and functional equivalents. Notwithstanding, none of the claims are intended to embrace subject matter that fails to satisfy the requirements of Sections 101, 102, or 103 of the Patent Act, nor should they be interpreted in such a way. Any unintended embracement of such subject matter is hereby disclaimed.

Except as stated in the previous paragraph, nothing that has been stated or illustrated is intended or should be interpreted to cause a dedication of any component, step, feature, objects, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity from another without necessarily implying any relationship or order between such entities. The terms "comprise" and "include" in all their grammatical forms are intended to cover a non-exclusive inclusion, so that a process, method, article, apparatus, or composition of matter that comprises or includes a list of elements may also include other elements not expressly listed. An element preceded by "a" or "an" does not, without further constraints, preclude the existence of additional identical or similar elements.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features may be grouped together in various examples for the purpose of clarity of explanation.

This method of disclosure is not to be interpreted as reflecting an intention that the claims require more features than are expressly recited in each claim. Furthermore, features from one example may be freely included in another, or substituted for one another, without departing from the overall scope and spirit of the instant application.

What is claimed is:

1. A power receiver, comprising:
a power conversion structure positioned to receive an incoming power beam and configured to convert at least a portion of the incoming power beam to electricity; and
input optics configured to convert a substantially round power beam having a center to a substantially polygonal power beam, the input optics including:
a first set of reflection surfaces configured to shift a first portion of the substantially round power beam away from the center; and
a second set of reflection surfaces configured to shift a second portion of the substantially round power beam away from the center, the second set of reflection surfaces being positioned at an angle to the first set of reflection surfaces.

2. The power receiver of claim 1, further comprising an output connector configured to transmit the converted electricity to an external load.

3. The power receiver of claim 1, wherein the first set of reflection surfaces and the second set of reflection surfaces are substantially orthogonal.

4. The power receiver of claim 3, wherein the input optics are configured to convert the substantially round power beam into a substantially rectangular power beam.

5. The power receiver of claim 3, wherein the input optics are configured to convert the substantially round power beam into a substantially square power beam.

6. The power receiver of claim 1, wherein the first set of reflection surfaces is configured to split the shifted first portion of the power beam into at least two split portions and to shift the at least two split portions in different directions.

7. The power receiver of claim 6, wherein the first set of reflection surfaces is configured to shift the at least two split portions in opposing directions.

8. The power receiver of claim 1, wherein the first portion of the substantially round power beam is noncontiguous.

9. The power receiver of claim 8, wherein the second portion of the substantially round power beam is noncontiguous.

10. The power receiver of claim 1, wherein the first set of reflection surfaces includes a plurality of substantially optically transparent surfaces positioned at an angle to a direction of the incoming power beam.

11. The power receiver of claim 10, wherein the plurality of substantially optically transparent surfaces include a reflective coating.

12. A power receiver, comprising:
a power conversion structure positioned to receive an incoming power beam and configured to convert at least a portion of the incoming power beam to electricity;
input optics configured to convert a Gaussian power beam having a center and having a substantially Gaussian intensity profile to a super-Gaussian power beam having a substantially super-Gaussian intensity profile, the input optics including:
a first set of reflection surfaces configured to shift a first portion of the Gaussian power beam away from the center; and
a second set of reflection surfaces configured to shift a second portion of the Gaussian power beam away from the center, the second set of reflection surfaces being positioned at an angle to the first set of reflection surfaces.

13. The power receiver of claim 12, further comprising an output connector configured to transmit the converted electricity to an external load.

14. The power receiver of claim 12, wherein the first set of reflection surfaces and the second set of reflection surfaces are substantially orthogonal.

15. The power receiver of claim 12, wherein the super-Gaussian power beam exhibits mirror symmetry.

16. The power receiver of claim 12, wherein the super-Gaussian power beam exhibits dihedral symmetry.

17. The power receiver of claim 12, wherein the first portion of the substantially round power beam is noncontiguous.

18. The power receiver of claim 17, wherein the second portion of the substantially round power beam is noncontiguous.

19. The power receiver of claim 12, wherein the first set of reflection surfaces includes a plurality of substantially optically transparent surfaces positioned at an angle to a direction of the incoming power beam.

20. The power receiver of claim 19, wherein the plurality of substantially optically transparent surfaces include a reflective coating.

* * * * *